(12) United States Patent
Fukuta

(10) Patent No.: US 11,001,180 B2
(45) Date of Patent: May 11, 2021

(54) VEHICLE SEAT CORE AND SEAT PAD

(71) Applicant: SEKISUI PLASTICS CO., LTD., Osaka (JP)

(72) Inventor: Atsushi Fukuta, Osaka (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 0 days.

(21) Appl. No.: 16/641,075

(22) PCT Filed: Aug. 14, 2018

(86) PCT No.: PCT/JP2018/030257
§ 371 (c)(1),
(2) Date: Feb. 21, 2020

(87) PCT Pub. No.: WO2019/039350
PCT Pub. Date: Feb. 28, 2019

(65) Prior Publication Data
US 2020/0282886 A1 Sep. 10, 2020

(30) Foreign Application Priority Data
Aug. 21, 2017 (JP) ............................. JP2017-158417

(51) Int. Cl.
*B60N 2/68* (2006.01)
*B60N 2/70* (2006.01)
(Continued)

(52) U.S. Cl.
CPC ............ *B60N 2/7017* (2013.01); *A47C 7/185* (2013.01); *B29C 44/12* (2013.01); *B29L 2031/58* (2013.01)

(58) Field of Classification Search
CPC .......... B60N 2/7017; B60N 2/68; B60N 2/70; A47C 7/185
(Continued)

(56) References Cited

U.S. PATENT DOCUMENTS 9,902,098 B2 * 2/2018 Takayama ............... B29C 44/56
10,414,309 B2 * 9/2019 Noro ........................ B60N 2/68
(Continued)

FOREIGN PATENT DOCUMENTS

EP      2 425 749      3/2012
JP      2010-259535      11/2010
(Continued)

OTHER PUBLICATIONS

International Search Report dated Nov. 20, 2018 in corresponding International Application No. PCT/JP2018/030257.

*Primary Examiner* — Rodney B White
(74) *Attorney, Agent, or Firm* — Wenderoth, Lind & Ponack, L.L.P.

(57) ABSTRACT

The present invention provides means for improving bondability between a vehicle seat core and a cushion in a vehicle seat pad formed by integration of them without significantly impairing mechanical properties. A vehicle seat core is characterized in that it is a vehicle seat core for forming a vehicle seat pad by integration with a cushion, which comprises a foamed resin molded body obtained by filling a cavity of a mold with a plurality of foamed resin particles and performing in-mold foam molding, and that at least a partial region of a surface of the foamed resin molded body to which the cushion is bonded when forming the vehicle seat pad has a surface expansion rate of 40% to 85%, and the foamed resin molded body has a first fusion rate of 95% or more or a second fusion rate of 60% or more.

16 Claims, 16 Drawing Sheets

(51) Int. Cl.
*A47C 7/18* (2006.01)
*B29C 44/12* (2006.01)
*B29L 31/58* (2006.01)

(58) Field of Classification Search
USPC ............ 297/452.26, 452.27, 452.48, 452.49,
297/452.52, 452.53
See application file for complete search history.

(56) References Cited

U.S. PATENT DOCUMENTS

| | | | |
|---|---|---|---|
| 10,647,035 B2* | 5/2020 | Sakakibara | B60N 2/682 |
| 10,717,370 B2* | 7/2020 | Hisamatsu | A47C 27/144 |
| 10,773,623 B2* | 9/2020 | Sakakibara | B29C 44/1271 |
| 10,875,436 B2* | 12/2020 | Takayama | B60N 2/015 |
| 2015/0118426 A1* | 4/2015 | Roberts | B60N 2/7017 |
| | | | 297/452.18 X |
| 2017/0334106 A1* | 11/2017 | Sameshima | B29C 44/445 |
| 2019/0030765 A1* | 1/2019 | Tobimatsu | B29C 44/00 |
| 2019/0030766 A1* | 1/2019 | Tobimatsu | B29C 39/10 |
| 2019/0047453 A1* | 2/2019 | Sakakibara | B60N 2/7017 |
| 2019/0176668 A1* | 6/2019 | Araki | B60N 2/7017 |
| 2019/0193614 A1* | 6/2019 | Nakao | B60N 2/7094 |
| 2019/0350365 A1* | 11/2019 | Hashimoto | B60N 2/68 |

FOREIGN PATENT DOCUMENTS

| | | | | |
|---|---|---|---|---|
| JP | 2011-45629 | | 3/2011 | |
| JP | 2017113053 A | * | 6/2017 | ............. B60N 2/682 |

* cited by examiner

VEHICLE SEAT CORE AND SEAT PAD

TECHNICAL FIELD

The present invention relates to a vehicle seat core.

The present invention also relates to a vehicle seat pad and a method for producing the same.

BACKGROUND ART

Vehicle seats of automobiles, bicycles, or other vehicles generally include a seat pad and a surface cover that covers the seat pad. As a seat pad for a vehicle, there is a known seat pad which includes a cushion that is elastically deformed by a load and a seat core that imparts rigidity to the cushion, and which is formed by stacking the cushion on the core (Patent Literature 1).

A seat core and a cushion which constitute a seat pad of the above aspect can be formed with resin materials having different degrees of hardness.

For example. Patent Literature 2 discloses a seat pad in which a seat pad body corresponding to a cushion is formed with a soft foamed resin material, a separate member corresponding to a seat core is formed with a bead foam, and the seat pad body and the separate member are placed to be bonded. Patent Literature 2 also discloses that in order to increase the adhesion strength between the seat pad body (cushion) and the separate member (seat core), the fusion rate (corresponding to a first fusion rate described later) of the bead foam is reduced.

CITATION LIST

Patent Literature

Patent Literature 1: JP Patent Publication (Kokai) No. 2011-45629 A

Patent Literature 2: JP Patent Publication (Kokai) No. 2010-259535 A

SUMMARY OF INVENTION

Technical Problem

As described above, Patent Literature 2 discloses that the peeling strength between the bead foam and the seat pad body comprising a soft foamed resin material is increased by reducing the fusion rate (corresponding to a first fusion rate described later) of the bead foam.

However, when the fusion rate is reduced, mechanical properties of the bead foam against compression, bending, tension, or other properties may be impaired.

Therefore, the present invention provides means for improving bondability between a vehicle seat core and a cushion in a vehicle seat pad formed by integration of them without significantly impairing mechanical properties.

Solution to Problem

In a first embodiment of the present invention, a vehicle seat core is characterized in that it is a vehicle seat core for forming a vehicle seat pad by integration with a cushion, comprising a foamed resin molded body obtained by filling a cavity of a mold with a plurality of foamed resin particles and performing in-mold foam molding, at least a partial region of a surface of the foamed resin molded body to which the cushion is bonded when forming the vehicle seat pad has a surface expansion rate of 40% to 85%, the surface expansion rate being a proportion of an area of a surface on a virtual plane corresponding to the mold of the foamed resin molded body with respect to an area of the virtual plane within the region, and the foamed resin molded body has a first fusion rate of 95% or more, the first fusion rate being a proportion of an area of foamed resin particles that appear on a cross-section obtained when cutting the foamed resin molded body with respect to an area of the cross-section.

In a second embodiment of the present invention, a vehicle seat core is characterized in that it is a vehicle seat core for forming a vehicle seat pad by integration with a cushion, comprising a foamed resin molded body obtained by filling a cavity of a mold with a plurality of foamed resin particles and performing in-mold foam molding, at least a partial region of a surface of the foamed resin molded body to which the cushion is bonded when forming the vehicle seat pad has a surface expansion rate of 40% to 85%, the surface expansion rate being a proportion of an area of a surface on a virtual plane corresponding to the mold of the foamed resin molded body with respect to an area of the virtual plane within the region, and the foamed resin molded body has a second fusion rate of 60% or more, the second fusion rate being a proportion of the number of foamed resin particles each having a fracture inside thereof with respect to the total number of foamed resin particles that appear on a fracture surface when dividing the foamed resin molded body.

The vehicle seat core of the present invention includes a region having a surface expansion rate of 40% to 85% and preferably 60% to 85% on a surface of a foamed resin molded body to which a cushion is bonded when forming the vehicle seat pad. Thus, in a case in which the vehicle seat core is used in a method comprising accommodating the vehicle seat core in a cavity of a seat pad mold and filling the cavity of the seat pad mold in which the vehicle seat core is accommodated with a resin solution that forms a cushion by foaming and curing, and then performing foaming and curing, thereby forming a cushion (insert molding), the cushion can be penetrated into the foamed resin molded body, allowing firm bonding in a state in which the cushion and the foamed resin molded body are difficult to peel off.

In addition, the vehicle seat core of the present invention has sufficiently high mechanical properties because it comprises a foamed resin molded body having a first fusion rate of 95% or more and/or a foamed resin molded body having a second fusion rate of 60% or more.

That is to say, the vehicle seat core of the present invention can be firmly bonded to a cushion by insert molding without significantly impairing mechanical properties.

In another preferred embodiment of the present invention, at least a partial region of a surface of the foamed resin molded body to which the cushion is not bonded when forming the vehicle seat pad has a surface expansion rate of 90% or more.

In this embodiment of the vehicle seat core of the present invention, since the foamed resin molded body includes a smooth surface on a portion that is not involved in the bonding of the cushion, the notch effect is reduced and the strength against fracture is improved.

In another preferred embodiment of the vehicle seat core of the present invention, a plurality of protrusions having a height of 40 μm or more are formed at a part of the surface of the foamed resin molded body to which the cushion is bonded when forming the vehicle seat pad. More preferably, the plurality of protrusions are a plurality of ridges, and a pitch between the plurality of ridges is 0.8 mm to 1.5 mm.

According to this embodiment of the vehicle seat core of the present invention, when a cushion is formed by insert molding, a plurality of protrusions can penetrate into the cushion. Therefore, the vehicle seat core can be more firmly bonded to the cushion.

The present invention also provides a vehicle seat pad, which comprises
the vehicle seat core of the present invention having the above characteristics and
a cushion that is bonded to the foamed resin molded body of the vehicle seat core so as to be integrated with the vehicle seat core.

The vehicle seat pad of the present invention has sufficiently high mechanical properties. Accordingly, the vehicle seat core and the cushion are difficult to peel off.

In a preferred embodiment of the vehicle seat pad of the present invention, a portion of the cushion bonded with foamed resin molded body is penetrating into the foamed resin molded body. Due to this feature, the vehicle seat core and the cushion are more firmly bonded to each other.

The present invention also provides
a method for producing a vehicle seat pad, comprising:
accommodating the vehicle seat core of the present invention in a cavity of a seat pad mold, the cavity having a shape corresponding to the vehicle seat pad; and
filling the cavity of the seat pad mold in which the vehicle seat core is accommodated with a resin solution that forms a cushion by foaming and curing; and,
performing foaming and curing, thereby forming the cushion.

The method of the present invention can produce a vehicle seat pad which has sufficiently high mechanical properties. In the vehicle seat pad produced by this method, the vehicle seat core and the cushion are difficult to peel off.

The present description includes part or all of the contents as disclosed in the description and/or drawings of Japanese Patent Application No. 2017-158417, which is a priority document of the present application.

Advantageous Effects of Invention

The vehicle seat core of the present invention can be firmly bonded to a cushion by insert molding without significantly impairing mechanical properties.

The vehicle seat pad of the present invention has sufficiently high mechanical properties and comprises a vehicle seat core and a cushion that are difficult to peel off.

The method for producing a vehicle seat pad of the present invention can produce a vehicle seat pad which has sufficiently high mechanical properties and comprises a vehicle seat core and a cushion that are difficult to peel off.

DESCRIPTION OF EMBODIMENTS

Hereinafter, embodiments of the vehicle seat core and the vehicle seat pad according to the present invention will be described with reference to the drawings. However, the scope of the present invention is not limited to particular embodiments.

<1. Vehicle Seat Pad>

According to the present invention, a "vehicle seat pad" is a shock-absorbing pad used for a seat in a vehicle such as an automobile or a bicycle. For example, a vehicle seat for an automobile is composed of parts such as a seat cushion on which a passenger sits, a seat back on which a passenger leans, a headrest placed above the seat back, and an armrest on which a passenger puts his/her arm. According to the present invention, such "vehicle seat pad" may be a seat pad used for any portion of a vehicle seat as described above. The vehicle seat pad is covered with a surface cover as appropriate.

General features of a vehicle seat pad for use in a seat cushion in one embodiment of the present invention are described with reference to FIGS. 1 to 3. As mentioned above, a vehicle seat pad according to the present invention is not limited to one for use in a seat cushion.

Figure 1:
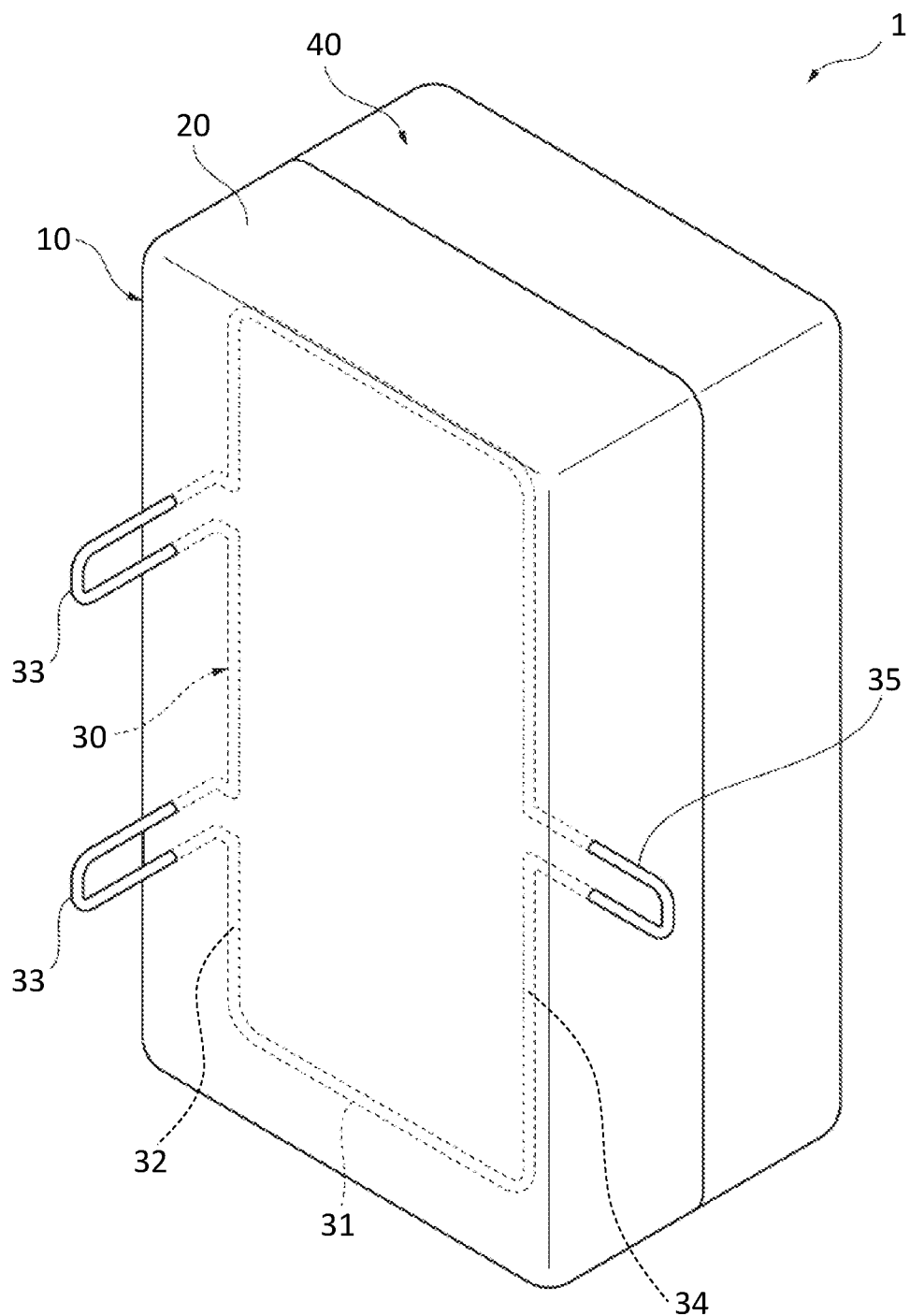
FIG. 1 is a perspective view of a vehicle seat pad 1.
Figure 2:
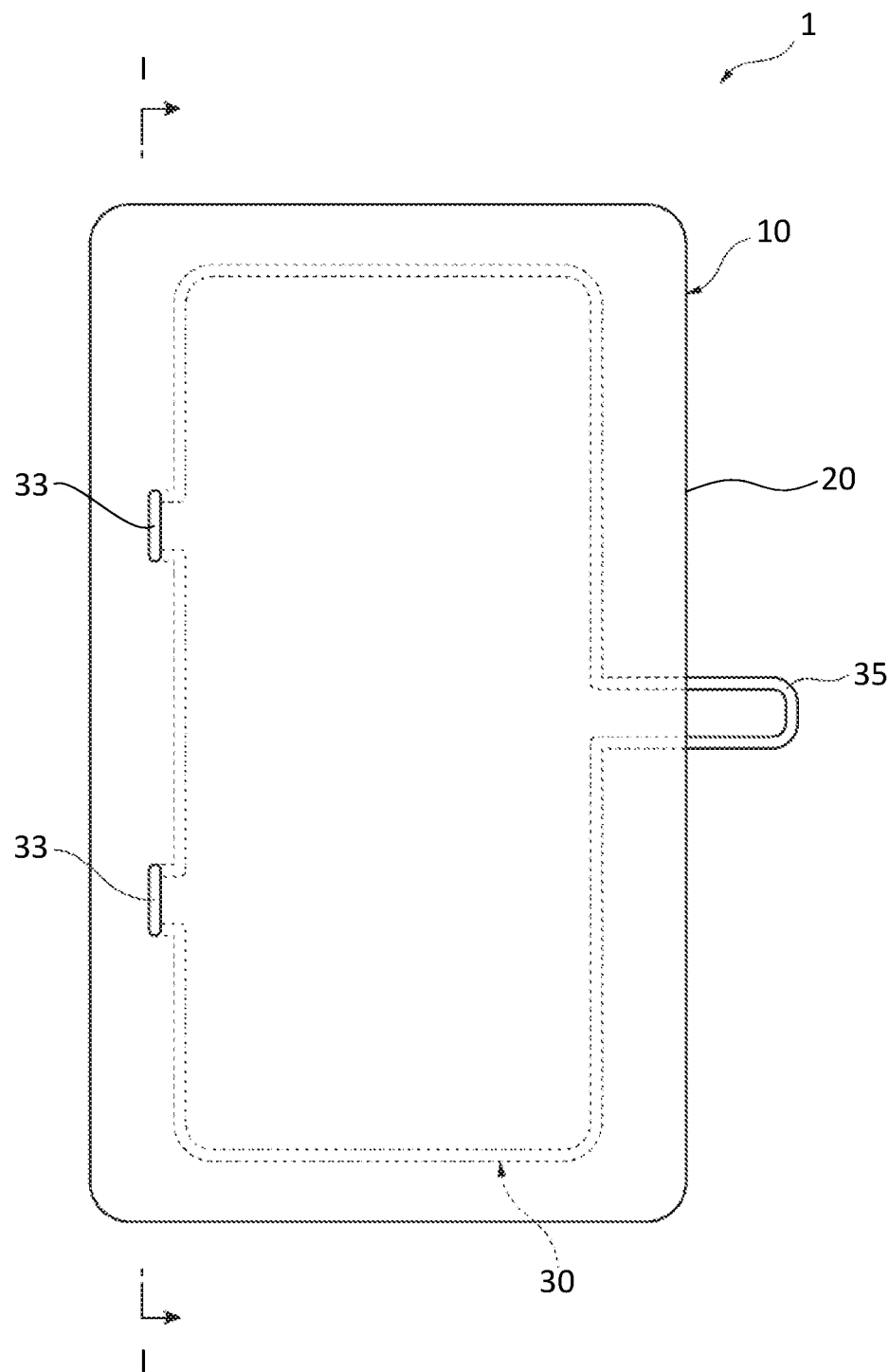
FIG. 2 schematically illustrates the vehicle seat pad in a plan view from the side of a vehicle seat core 10.

As illustrated in FIG. 1, a vehicle seat pad 1 comprises a vehicle seat core (hereinafter sometimes referred to as "seat core") 10, and a cushion 40 that is stacked on and integrated with the seat core 10. The cushion 40 is placed on a side in contact with a passenger of the seat core 10 and is integrated with the seat core 10.

The seat core 10 of this embodiment comprises at least a foamed resin molded body 20, and further comprises a frame 30 that is embedded in the foamed resin molded body 20 by integral molding.

There are no particular restrictions on the overall shape of the seat core 10 and the foamed resin molded body 20. However, the shape is usually a shape that is rectangular in a plan view, for example, approximately rectangular. In such case, the overall shape of the seat core 10 and the foamed resin molded body 20 usually extends in a plane direction. Needless to say, the shape and thickness of the seat core 10 and the foamed resin molded body 20 in a plan view may vary depending on the shape of a vehicle body to which the vehicle seat pad 1 is attached.

Features of the foamed resin molded body 20 will be described later.

In the illustrated embodiment, the frame 30 is embedded in the foamed resin molded body 20 for imparting required shape retention and strength. In general, steel wire rod (wire) with a diameter of about 3 to 6 mm is used. It may be thin-plate steel. The frame 30 includes: a main body 31 that is embedded along the outer periphery of the foamed resin molded body 20 in a plan view at a site slightly inside the outer peripheral surface as illustrated; and two first protrusions 33, 33 that are formed with a portion 32 along one side in the longitudinal direction of the foamed resin molded body 20 in the main body 31. Here, the first protrusions 33, 33 are not necessarily formed on the portion 32. In addition, in the illustrated example, a second protrusion 35 is also formed on a portion 34 of the main body 31 along the other longitudinal side of the foamed resin molded body 20, although it is not essential.

The first protrusions 33, 33 stick out towards the thickness direction of the foamed resin molded body 20, and their tips protrude from the back side of the foamed resin molded body 20 to the outside. In addition, the second protrusion 35 sticks out towards the plane direction of the foamed resin molded body 20, and its tip protrudes from one side of the foamed resin molded body 20 to the outside. In the illustrated example, the first and second protrusions 33, 35 are formed by bending the steel wire rod that constitutes the main body 31 into an approximately U shape, but they may be formed by integrating an approximately U-shaped protrusion that is separately composed with the main body 31 by welding or the like.

The vehicle seat pad 1 is fixed to a vehicle body by engaging the first protrusions 33, 33 and the second protrusion 35 with a mounting jig on the vehicle body for mounting the vehicle seat pad 1.

The cushion 40 is composed of a material that can be elastically deformed when a load is applied. Features of the cushion 40 will be described later.

It is preferable that the foamed resin molded body 20 of the seat core 10 is formed with a resin having a compressive strength larger than that of the cushion 40, thereby preventing excessive deformation of the vehicle seat pad 1. Meanwhile, it is preferable that the cushion 40 is formed with a resin having a compressive strength smaller than that of the foamed resin molded body 20, thereby giving a passenger a comfortable feeling of elasticity. Although not shown, the vehicle seat pad 1 may be covered with a cover material as appropriate in practical use.

<2. Vehicle Seat Core>

The vehicle seat core 10 comprises the foamed resin molded body 20 as described above. In the illustrated embodiment, the vehicle seat core 10 further comprises the frame 30 embedded in the foamed resin molded body 20. However, the frame 30 is not an essential component in the present invention. Features of the foamed resin molded body 20 will be described below.

The foamed resin molded body 20 is obtained by filling a cavity of a mold with a plurality of foamed resin particles and performing foam molding in the mold.

Here, the type of resin as the main component of the foamed resin molded body 20 and foamed resin particles 21 (see, for example, FIG. 4) for producing the same is not particularly limited. However, a thermoplastic resin is usually used. For example, a polystyrene resin, a composite resin containing a polystyrene resin and a polyolefin resin, a polyolefin resin, a polyester resin, or the like is preferably used.

Examples of a polystyrene resin include resins derived from styrene monomers such as styrene and substituted styrene (substituents are lower alkyl, halogen atoms (particularly chlorine atoms), and the like). Examples of substituted styrene include α-methylstyrene, p-methylstyrene, t-butylstyrene, and chlorostyrene. Further, the polystyrene resin may be a homopolymer of a styrene monomer or a copolymer of a styrene monomer and another monomer copolymerizable with the styrene monomer. Examples of other monomers include acrylonitrile, (meth)acrylic acid alkyl ester (with an alkyl moiety having about 1 to 8 carbon atoms), divinylbenzene, mono or di(meth)acrylic acid ester of ethylene glycol, maleic anhydride, and N-phenylmaleimide.

Examples of a polyolefin resin include resins containing units derived from olefin monomers having 2 to 10 carbon atoms such as polypropylene and polyethylene. The polyolefin resin may be a homopolymer of an olefin monomer or a copolymer of an olefin monomer and another monomer copolymerizable with the olefin monomer.

A composite resin including a polystyrene resin and a polyolefin resin is a resin in which a polystyrene resin and a polyolefin resin are combined as described above. The compounding ratio of a polystyrene resin and a polyolefin resin in a composite resin is not limited. For example, the content of the polystyrene resin may be 120 to 400 parts by mass with respect to 100 parts by mass of the polyolefin resin.

Examples of the polyester resin include polyethylene terephthalate.

The resin may contain other additives. Examples of other additives include a colorant, a flame retardant, a flame retardant aid, an antioxidant, and an ultraviolet absorber.

The foamed resin particles 21 are prepared by heating foamable resin particles using water vapor followed by prefoaming. The foamable resin particles may be obtained by impregnating resin particles with a foaming agent.

The foaming agent is not particularly limited. In particular, an organic compound in a gaseous or liquid state at normal pressure having a boiling point equal to or less than the softening point of the resin used is suitable. Examples thereof include hydrocarbons such as propane, n-butane, isobutane, n-pentane, isopentane, neopentane, cyclopentane, cyclopentadiene, n-hexane, and petroleum ether. These foaming agents may be used alone or in combination of two or more thereof. The method for impregnating the resin particles with the foaming agent is not particularly limited.

The preferred content of the foaming agent in foamable resin particles for forming foamed resin particles 21 by prefoaming is 5 to 25 parts by mass with respect to 100 parts by mass of the foamable resin particles. Here, the foaming agent content in the foamable resin particles is measured after the foamable resin particles are left in a constant temperature room at 13° C. for 5 days immediately after production.

The expansion ratio of foamed resin particles 21 obtained by prefoaming of foamable resin particles can be adjusted as appropriate according to the type of resin. It is generally an expansion ratio of 10 to 60, preferably an expansion ratio of 10 to 50, and more preferably an expansion ratio of 20 to 50. The foamed resin particles 21 are preferably stored and aged at 20° C. to 60° C. for about 24 hours after prefoaming.

Here, the expansion ratio of foamed resin particles is determined by the following procedures.

First, W g of foamed resin particles are collected as a measurement sample, and the volume V cm$^3$ when this measurement sample is placed in a measuring cylinder is measured using an apparent density measurement instrument complying with JIS K6911. The expansion ratio (bulk expansion ratio) of the foamed particles is determined based on the following equation:

Expansion ratio (times=cm$^3$/g)=Volume of measurement sample (V)/Mass of measurement sample (W)

The shape of foamed resin particles 21 may be a spherical shape, an elliptical spherical shape (egg shape), or any other shape. The spherical shape also includes an approximately spherical shape. The elliptical spherical shape also includes an approximately elliptical spherical. There are no particular restrictions on the ratio (L/D) of the maximum diameter L and the minimum diameter D of each foamed resin particle 21. However, the ratio is preferably 1.0 to 1.6 and more preferably 1.0 to 1.2.

There are no particular restrictions on the dimensions of foamed resin particles 21. However, the average particle diameter is preferably 1.5 to 5.0 mm and more preferably 2.0 to 4.0 mm. Here, the average particle diameter is measured by the following measurement method. About 50 g of foamed particles are classified with JIS standard sieves having sieve openings of 16.00 mm, 13.20 mm, 11.20 mm, 9.50 mm, 8.00 mm, 6.70 mm, 5.60 mm, 4.75 mm, 4.00 mm, 3.35 mm, 2.80 mm, 2.36 mm, 2.00 mm, 1.70 mm, 1.40 mm, 1.18 mm, and 1.00 mm for 5 minutes using a low tap type sieve shaker (manufactured by SIEVE FACTORY IIDA Co., Ltd.). The sample mass on each sieve mesh is measured, and based on the cumulative mass distribution curve obtained from the results, the particle diameter (median diameter) at which the cumulative mass is 50% is defined as the average particle diameter.

The foamed resin molded body 20 is characterized in that at least a partial region 20c of a surface 20A to which the cushion 40 is bonded when forming the vehicle seat pad 1 is a region having a surface expansion rate of 40% to 85%.

The surface expansion rate is a proportion of the area of a surface 20Y of the foamed resin molded body 20 positioned on a virtual plane 20X corresponding to the mold 100 with respect to the area of the virtual plane 20X within the region 20c.

Here, the "surface expansion rate" is explained with reference to FIGS. 10 and 11.

Figure 10:
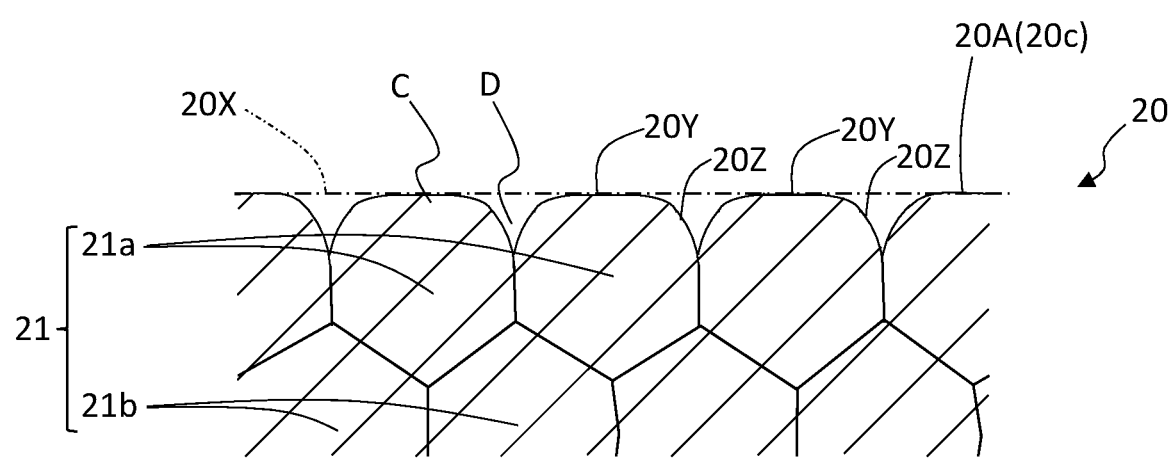
FIG. 10 is a cross-sectional schematic diagram of a vicinity of a region 20c having a surface expansion rate of 40% to 85% on a surface 20A of a foamed resin molded body 20 to which a cushion 40 is bonded.
Figure 11:
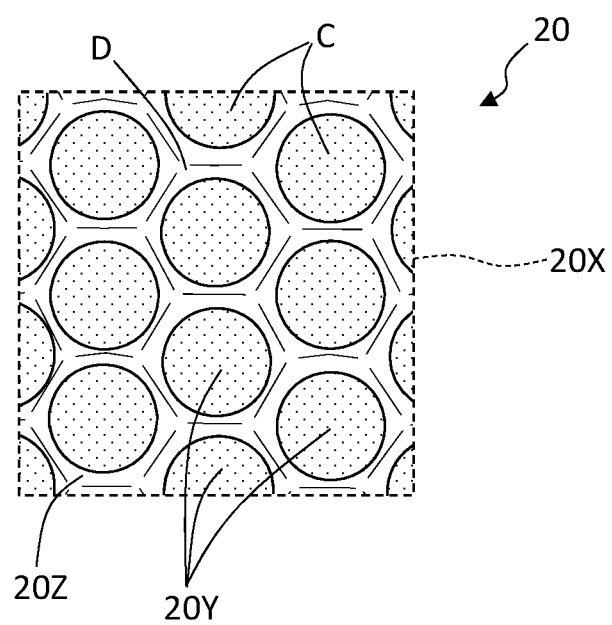
FIG. 11 is a schematic view of the region 20c of the foamed resin molded body 20 (cross-sectionally illustrated in FIG. 10) when viewed from the side on which the cushion 40 is bonded.

FIG. 10 is a cross-sectional schematic diagram of a vicinity of a region 20c having a surface expansion rate in the above range on a surface 20A of a foamed resin molded body 20 to which a cushion 40 is bonded. FIG. 11 is a schematic view of the region 20c of the foamed resin molded body 20 illustrated in FIG. 10 when viewed from the side on which the cushion 40 is bonded.

As described later referring to FIGS. 4 to 9, the foamed resin molded body 20 is produced by filling a cavity 101 in the mold 100 with a plurality of foamed resin particles 21 and performing foam molding. Therefore, as illustrated in FIG. 10, the outline of the foamed resin molded body 20 is formed along the virtual plane 20X corresponding to the mold 100. A part of each of the surfaces of a plurality of foamed resin particles 21a positioned in the outermost layer of the foamed resin molded body 20, which abuts an inner surface 100A of the mold 100 and expands along the inner surface 100A during in-mold foam molding, is designated as a surface 20Y positioned on the virtual plane 20X of the foamed resin molded body 20. Meanwhile, a portion of the surface of each of a plurality of foamed resin particles 21a positioned in the outermost layer of the foamed resin molded body 20, which has not been in contact with the inner surface 100A of the mold 100 during in-mold foam molding, becomes a surface 20Z which is a depressed portion that is positioned inside the virtual plane 20X. As illustrated in FIG. 11, when viewed from the side where the cushion 40 is bonded, the surface 20Y on the virtual plane 20X of the foamed resin molded body 20 is composed of a plurality of portions distributed in the form of islands. In addition, the "surface expansion rate" is the proportion of the total area of the surface 20Y on the virtual plane 20X of the foamed resin molded body 20 included in a region of the surface of the foamed resin molded body 20 (e.g., the region illustrated in FIG. 11) with respect to the area of the virtual plane 20X on the region expressed as a percentage.

The surface of a foamed resin molded body 20 having a surface expansion rate of more than 0% to less than 100 has a concavo-convex structure having a convex portion C including the surface 20Y positioned on the virtual plane 20X and a concave portion D formed by a depressed surface 20Z around the surface 20Y. It is considered that when the cushion 40 is formed by insert molding on the surface of the foamed resin molded body 20 having this concavo-convex structure, the resin solution that forms the cushion 40 partially penetrates into the foamed resin molded body 20 through the concave portion D and solidifies.

Figure 12:
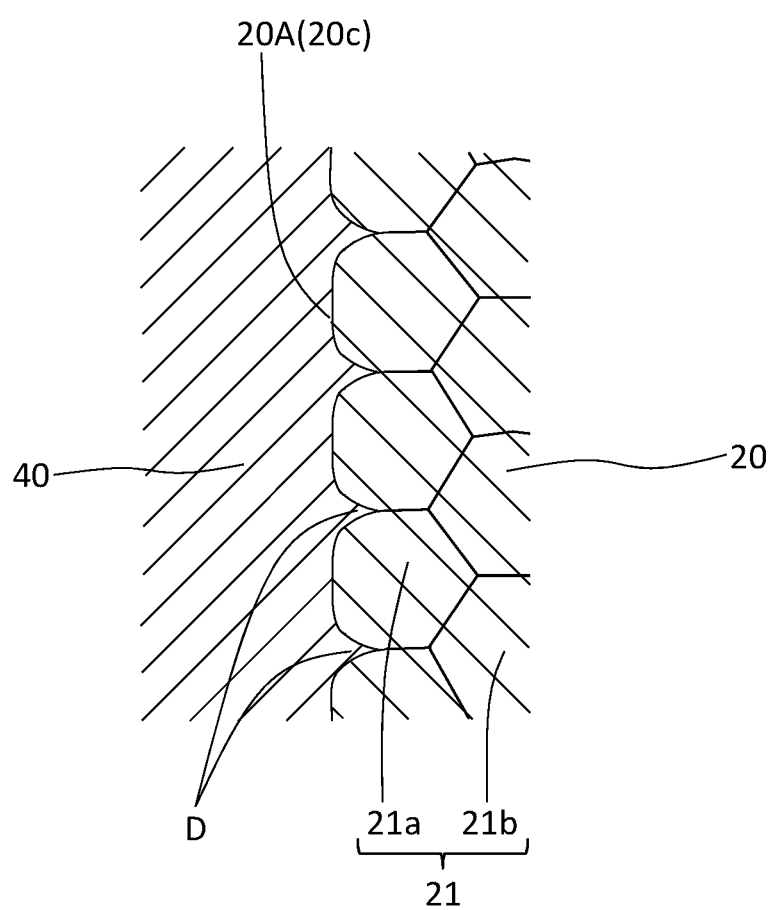
FIG. 12 schematically illustrates a cross-section of a portion corresponding to the portion 202 illustrated in FIG. 3, the portion being in the vicinity of the boundary between the foamed resin molded body 20 and the cushion 40 of the vehicle seat pad 1.

In particular, in a case in which the surface 20A of the foamed resin molded body 20 to which the cushion 40 is bonded has the region 20c having a surface expansion rate of 40% to 85%, an appropriate amount of the cushion 40 penetrates into the foamed resin molded body 20 in the region 20c as schematically illustrated in FIG. 12. Therefore, the foamed resin molded body 20 and the cushion 40 can be bonded firmly such that they are particularly difficult to peel off. This effect is particularly high when the surface expansion rate of the region 20c is small. In FIG. 12, for convenience, the cross-section shape of the region 20c on the surface 20A of the foamed resin molded body 20 bonded to the cushion 40 is depicted as the same shape as the cross-section shape illustrated in FIG. 10 before bonding the cushion 40. However, in practice, plasticization may occur due to the effect of heating during insert molding. It is presumed that the cross-section shape of the region 20c on the surface 20A of the foamed resin molded body 20 bonded to the cushion 40 differs from the cross-section shape before bonding the cushion 40.

Figure 3:
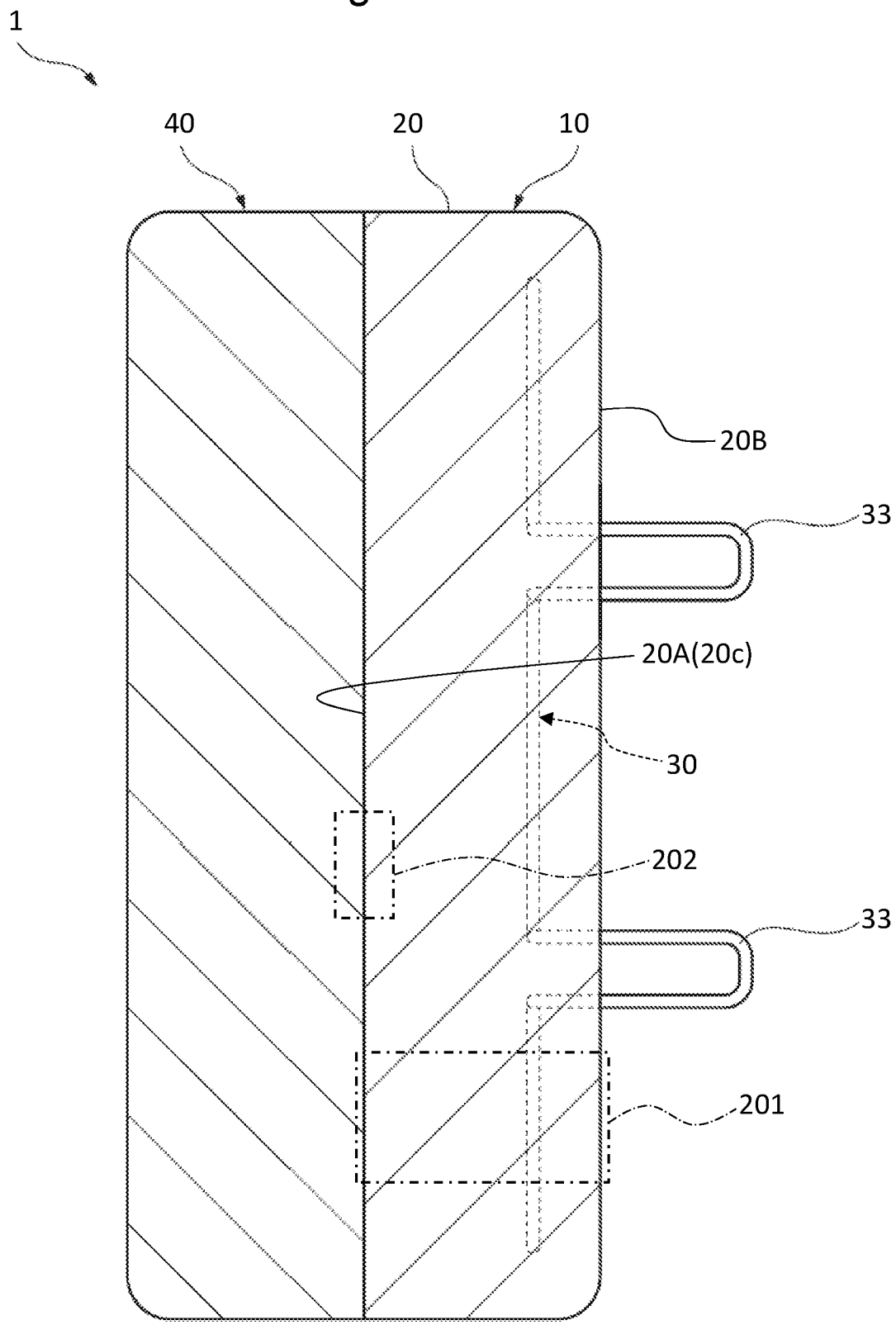
FIG. 3 is a cross-sectional schematic diagram along line I-I depicted in FIG. 2.

FIG. 12 schematically illustrates a cross-section of a portion corresponding to the portion 202 illustrated in FIG. 3, the portion being in the vicinity of the boundary between the foamed resin molded body 20 and the cushion 40 of the vehicle seat pad 1.

The proportion of the region 20c having a surface expansion rate of 40% to 85% on the surface 20A of the foamed resin molded body 20 to which the cushion 40 is bonded is not particularly limited. However, the larger the proportion of the region 20c, the better the bonding between the foamed resin molded body 20 and the cushion 40, which is preferable. The proportion of the region 20c having a surface expansion rate of 40% to 85% on the surface 20A of the foamed resin molded body 20 to which the cushion 40 is bonded is preferably 30% or more, more preferably 50% or more, still more preferably 70% or more, yet more preferably 80% or more, still yet more preferably 90% or more, still yet more preferably 95% or more, and still yet more preferably 100% in terms of area percentage. The area of each region 20c having a surface expansion rate of 20% to 80% is not particularly limited. However, for example, it is an area including 100 or more, preferably 200 or more, and more preferably 1000 or more foamed resin particles 21a in the outermost layer.

Examples of the method for measuring the surface expansion rate of the surface of the foamed resin molded body 20 include appropriate methods such as a method for performing image analysis of a photographic image of the surface of the foamed resin molded body 20 and a method comprising: applying ink to a specific region of the surface of the foamed resin molded body 20; and obtaining the proportion of the area of a portion where the ink is transferred onto paper when the specific region is brought into contact with the paper and then released from the paper with respect to the area of the specific region.

Although not shown, a surface 20B of the foamed resin molded body 20 to which the cushion 40 is not bonded includes at least a partial region having a surface expansion rate (as defined above) of preferably 90% or more and more preferably 95% or more. In this embodiment, since the foamed resin molded body 20 includes a smooth surface region on the surface that is not involved in the bonding of the cushion 40, the notch effect is reduced and the strength against fracture is increased.

In the first embodiment of the present invention, the foamed resin molded body 20 is further characterized in that the first fusion rate, which is the proportion of an area of foamed resin particles 21 that appear on a cross-section obtained when cutting the foamed resin molded body 20 with respect to an area of the cross-section, is 95% or more. Here, the first fusion rate corresponds to the "fusion rate" defined in Patent Literature 2, which is the proportion of an area of the foamed resin particles 21 per unit area (e.g., per $cm^2$) of a cross-section obtained when cutting the foamed resin molded body 20. The first fusion rate correlates with the filling rate of the foamed resin particles 21 inside the foamed resin molded body 20. In a case in which the first fusion rate is 95% or more for the foamed resin molded body 20, high mechanical strength is achieved because there are sufficiently few gaps between foamed resin particles 21.

Accordingly, the seat core 10 of the present invention is an appropriate vehicle seat core because mechanical strength of a portion thereof comprising the foamed resin molded body 20 is sufficiently high. The first fusion rate of the foamed resin molded body 20 is preferably more than 98%, more preferably 99% or more, and still more preferably 100%.

In the second embodiment of the present invention, the second fusion rate of the foamed resin molded body 20, which is a proportion of foamed resin particles 21 each having a fracture inside thereof with respect to the total number of foamed resin particles 21 that appear on a fracture surface when bending the foamed resin molded body 20 to cause a fracture, is preferably 60% or more, more preferably 80% or more, still more preferably 90% or more, yet more preferably 95% or more, still yet more preferably 98% or more, still yet more preferably 99% or more, and still yet more preferably 100%. Specifically, the second fusion rate can be measured by the following procedures. Each foamed resin molded body is divided into two by hand. The number of particles having a fracture inside thereof (a) and the number of particles having a fracture on the interface between particles (b) are counted within a range of 100 to 150 foamed particles appearing on a fracture surface. The value obtained by substituting the results into the formula $[(a)/((a)+(b))]*100$ is determined to be the second fusion rate (%). Each foamed resin molded body is divided into two by, for example, making a cut line with a depth of about 5 mm with a cutter knife along the center of the foamed resin molded body, and then, breaking the foamed resin molded body into two by hand along this cut line. The second fusion rate correlates with the strength of fusion between the foamed resin particles 21 inside the foamed resin molded body 20. In a case in which the second fusion rate is in the above range for the foamed resin molded body 20, the foamed resin particles 21 are sufficiently fused together, and the mechanical strength further increases, which is particularly suitable for a vehicle seat core.

In the second embodiment of the present invention, it is more preferable that the first fusion rate of the foamed resin molded body 20 is in the range described in the first embodiment of the present invention. In such case, mechanical strength of the foamed resin molded body 20 becomes particularly high.

Figure 13:
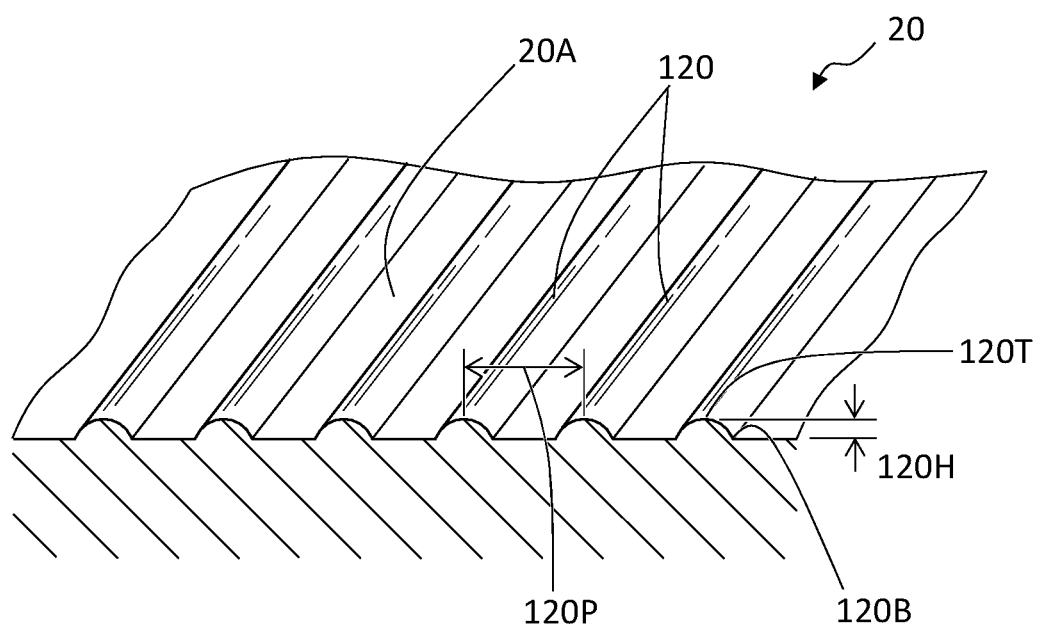
FIG. 13 is a schematic diagram for explaining a plurality of ridges 120 that can be formed on a surface 20A of a foamed resin molded body 20 to which a cushion 40 is bonded.

It is more preferable that a plurality of protrusions each having a height of 40 μm are formed on a part of the surface 20A of the foamed resin molded body 20 to which the cushion 40 is bonded. A specific example of such a protrusion is a ridge 120 as illustrated in FIG. 13. The height 120H of the ridge 120 indicates the distance along the protruding direction from a base 120B to a tip 120T of the ridge 120. The heights of other protrusions can be defined as well. In a case in which a plurality of protrusions exist on the surface 20A of the foamed resin molded body 20 to which the cushion 40 is bonded, when the cushion 40 is formed on the surface 20A by insert molding, bonding is completed in a state in which the plurality of protrusions are penetrating into the side of the cushion 40, and thus, the foamed resin molded body 20 and the cushion 40 can be bonded firmly such that they are particularly difficult to peel off, which is preferable. In order to further enhance this effect, the height of the protrusion such as a ridge 120 is more preferably 0.3 to 1.0 mm. The above effect is particularly high when the pitch 120P between adjacent pairs of a plurality of ridges 120 is 0.8 to 1.5 mm.

The above plurality of protrusions may be provided in the region 20c having a surface expansion rate of 40% to 85%, which is included in the surface 20A of the foamed resin molded body 20 to which the cushion 40 is bonded, or may be provided in a different region, for example, a relatively smooth region having a surface expansion rate exceeding 85%.

The method for forming the above plurality of protrusions is not particularly limited. For example, a plurality of protrusions can be formed using the mold 100 in which recesses corresponding to the plurality of protrusions are formed on the inner surface 100A. In addition, as described later, in a case in which a mold 100 provided with a steam nozzle 102 having steam holes 103 is used, when the steam holes 103 are opened in parallel on one steam nozzle 102 such that a plurality of slits are formed, a plurality of ridges 120 corresponding to the plurality of slits are formed on a surface 20A of a foamed resin molded body 20.

<3. Method for Producing Vehicle Seat Core>

The method for producing a seat core 10 will be described.

A seat core 10 is provided with a foamed resin molded body 20 and a frame 30 that is embedded in the foamed resin molded body 20 by integral molding.

Upon in-mold foam molding of the foamed resin molded body 20, the frame 30 can be embedded in the foamed resin molded body 20 by filling foamed resin particles 21 into a cavity 101 of a mold 100 while placing the frame 30 in the cavity and performing in-mold foam molding. The mold 100 can be configured by combining a pair of first mold 111 and a second mold 112.

The method for producing the foamed resin molded body 20 by in-mold foam molding will be described in detail below.

FIGS. 4 to 9 describe production steps using the foamed resin molded body 20 corresponding to the portion 201 illustrated in FIG. 3 as an example. In FIGS. 4 to 9, the depiction of frame 30 is omitted. The dimensions and shape of each element such as a foamed resin particles 21 or a mold 100 are drawn with emphasis as appropriate for the purpose of explanation, and do not reflect the actual dimensions and shape.

Figure 4:
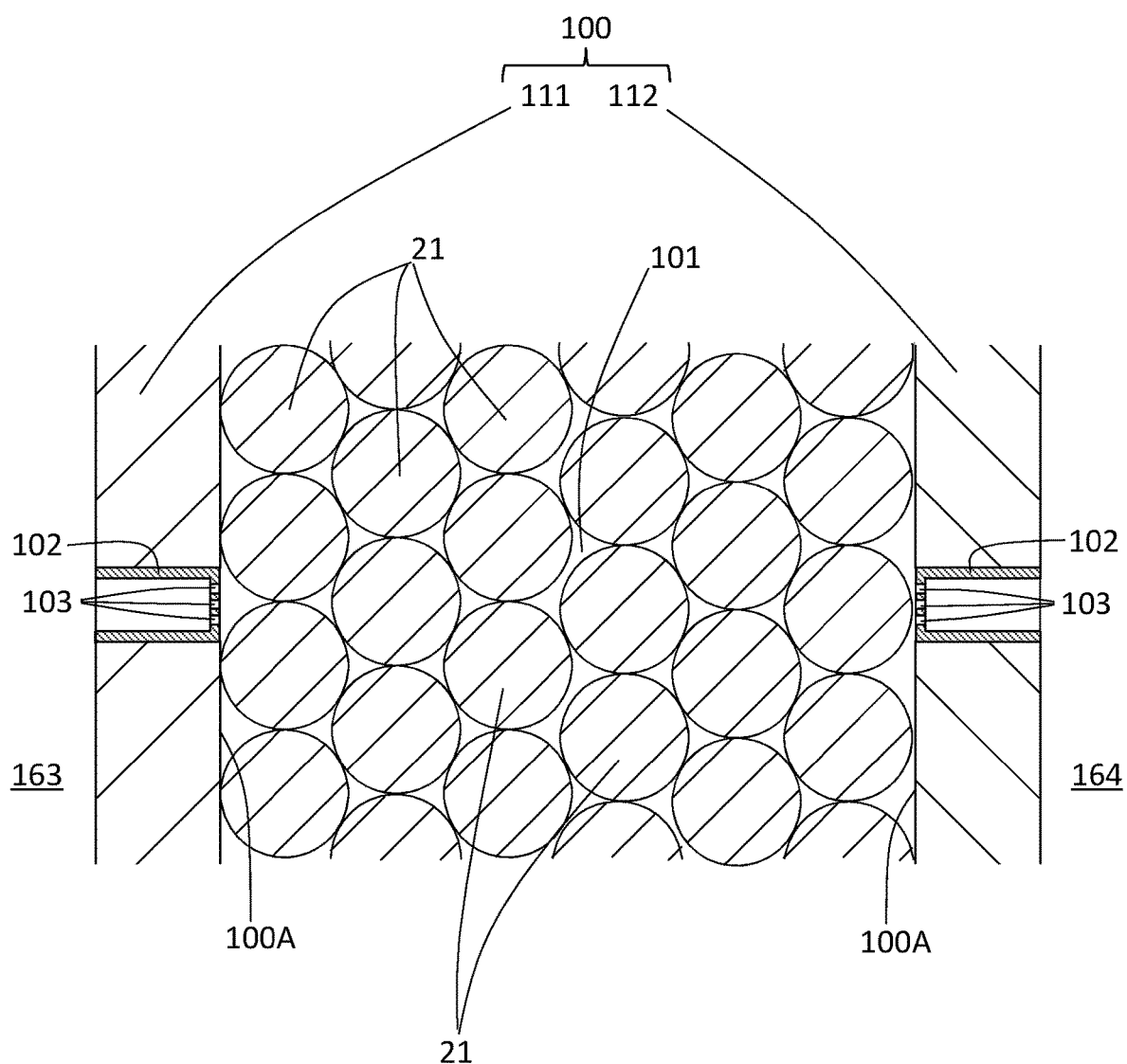
FIG. 4 is a cross-sectional schematic diagram for explaining a state in which a mold 100 is filled with foamed resin particles 21 in a method for producing a foamed resin molded body 20. The position depicted in FIG. 4 corresponds to a portion 201 of the foamed resin molded body 20 illustrated in FIG. 3.

As illustrated in FIG. 4, a cavity 101 of a mold 100 including a first mold 111 and a second mold 112 for a vehicle seat core is filled with a plurality of foamed resin particles 21 prefoamed from the foamable resin particles as described above. At such time, a frame 30 is placed in the cavity 101 as necessary. A first heating chamber 163 into which heating steam is introduced is formed outside the first mold 111, and a second heating chamber 164 into which heating steam is introduced is formed outside the second mold 112. In the first mold 111 and the second mold 112 constituting the mold 100, a number of steam nozzles 102 each having fine steam holes 103 for allowing water vapor from a steam chamber to pass therethrough are arranged at appropriate positions.

First, the first mold 111 and the second mold 112 are heated to an appropriate temperature. This step is referred to as "mold heating."

Figure 5:
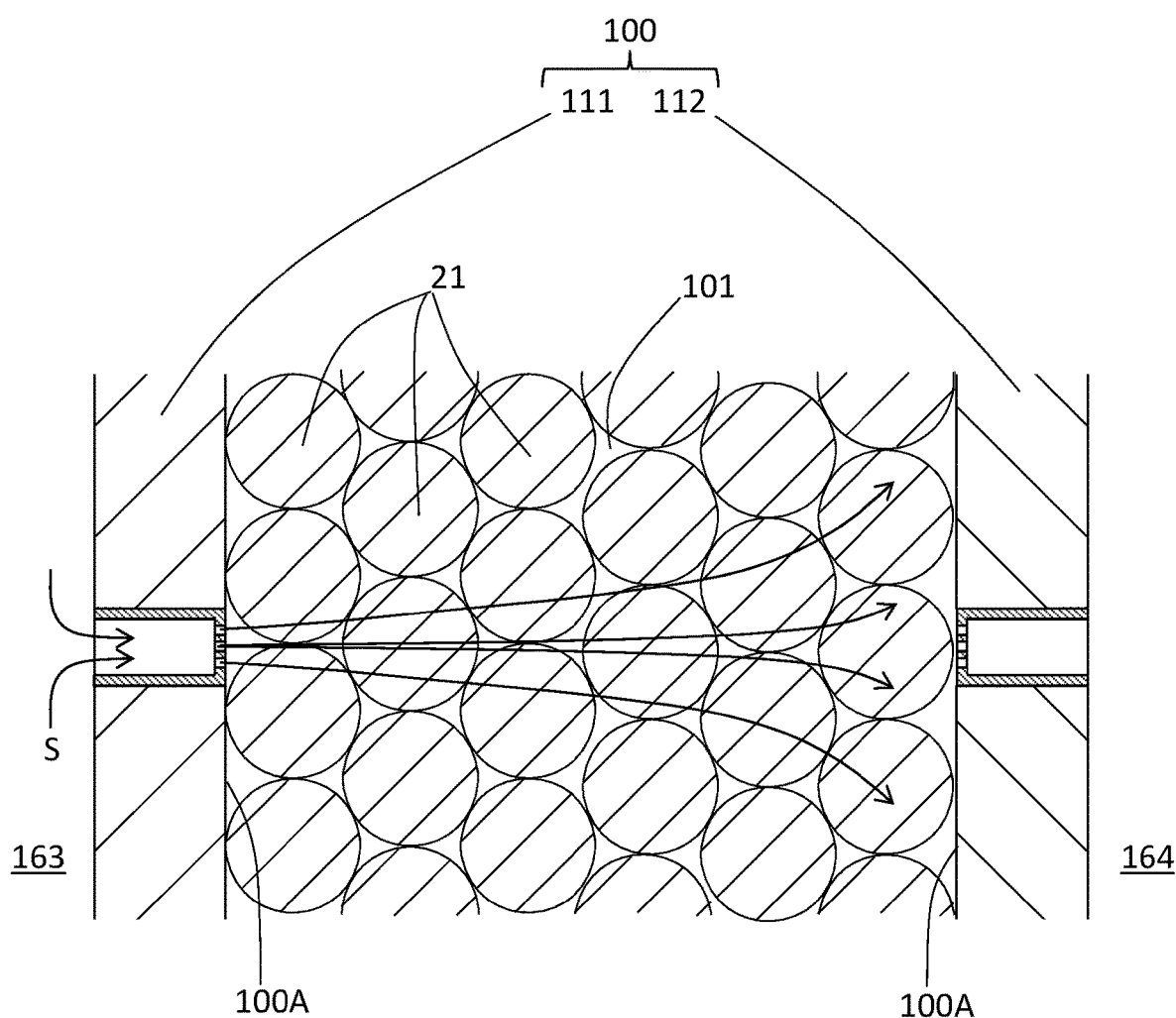
FIG. 5 is a cross-sectional schematic diagram for explaining a unidirectional heating step in a method for producing a foamed resin molded body 20. The position depicted in FIG. 5 corresponds to a portion 201 of the foamed resin molded body 20 illustrated in FIG. 3.

Next, as illustrated in FIG. 5, the water vapor pressure in the first heating chamber 163 is increased, and water vapor S is supplied into the cavity 101 from the side of the first mold 111 through the steam holes 103 of the steam nozzles 102 formed in the first mold 111. In this step, water vapor S passes from the side of the first mold 111 through each gap between foamed resin particles 21 and is supplied into the cavity 101, and thus, foaming of the foamed resin particles 21 proceeds. This step is referred to as "unidirectional heating."

Figure 6:
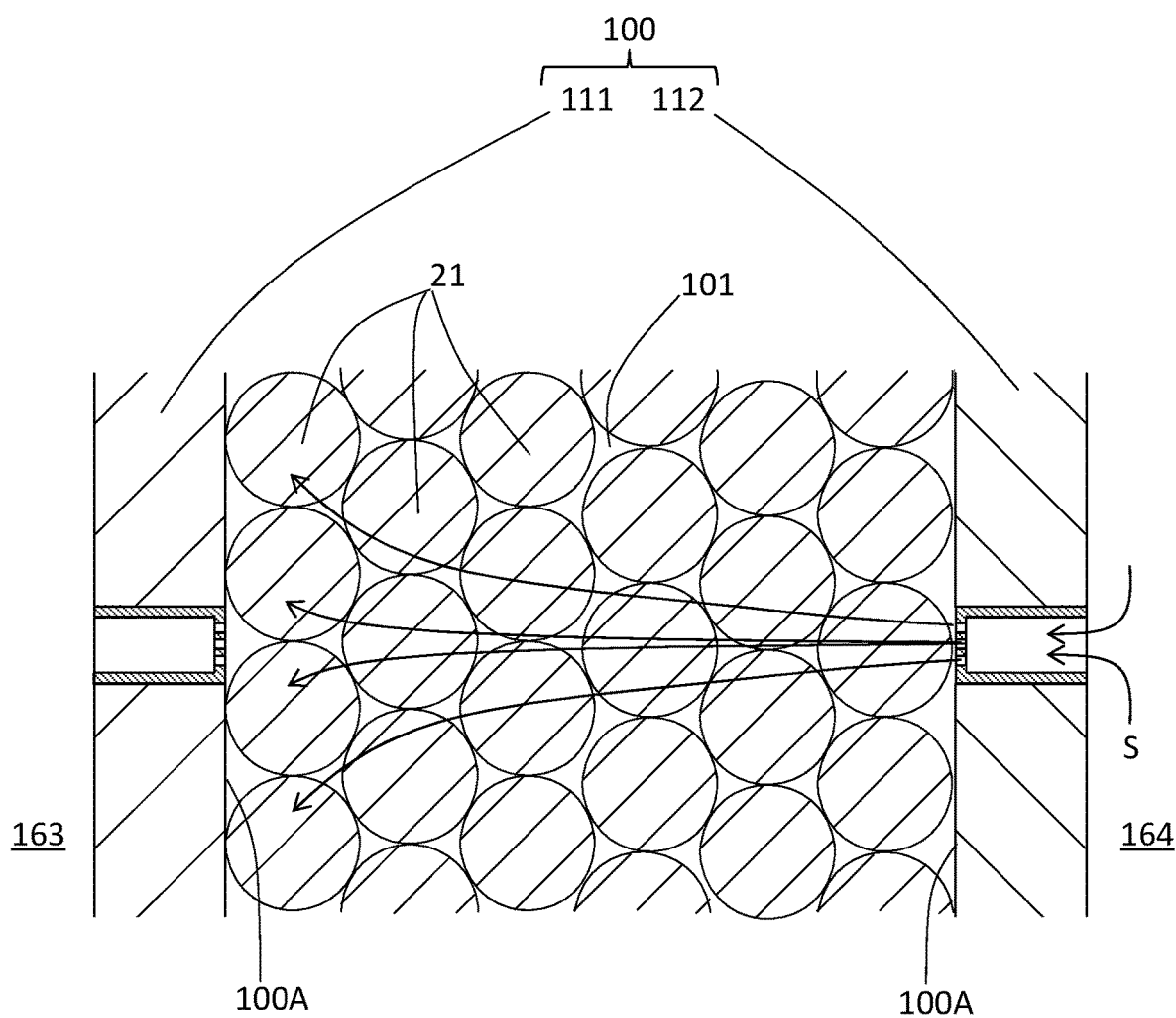
FIG. 6 is a cross-sectional schematic diagram for explaining a reverse unidirectional heating step in a method for producing a foamed resin molded body 20. The position depicted in FIG. 6 corresponds to a portion 201 of the foamed resin molded body 20 illustrated in FIG. 3.

Following the unidirectional heating step, as illustrated in FIG. 6, water vapor pressure in the second heating chamber 164 is increased, and water vapor S is supplied into the cavity 101 from the side of the second mold 112 through the steam holes 103 of the steam nozzles 102 formed in the second mold 112. In this step, water vapor S passes from the side of the second mold 112 through the gap between the foamed resin particles 21 and is supplied into the cavity 101, and thus, foaming of the foamed resin particles 21 proceeds. This step is referred to as "reverse unidirectional heating."

Figure 7:
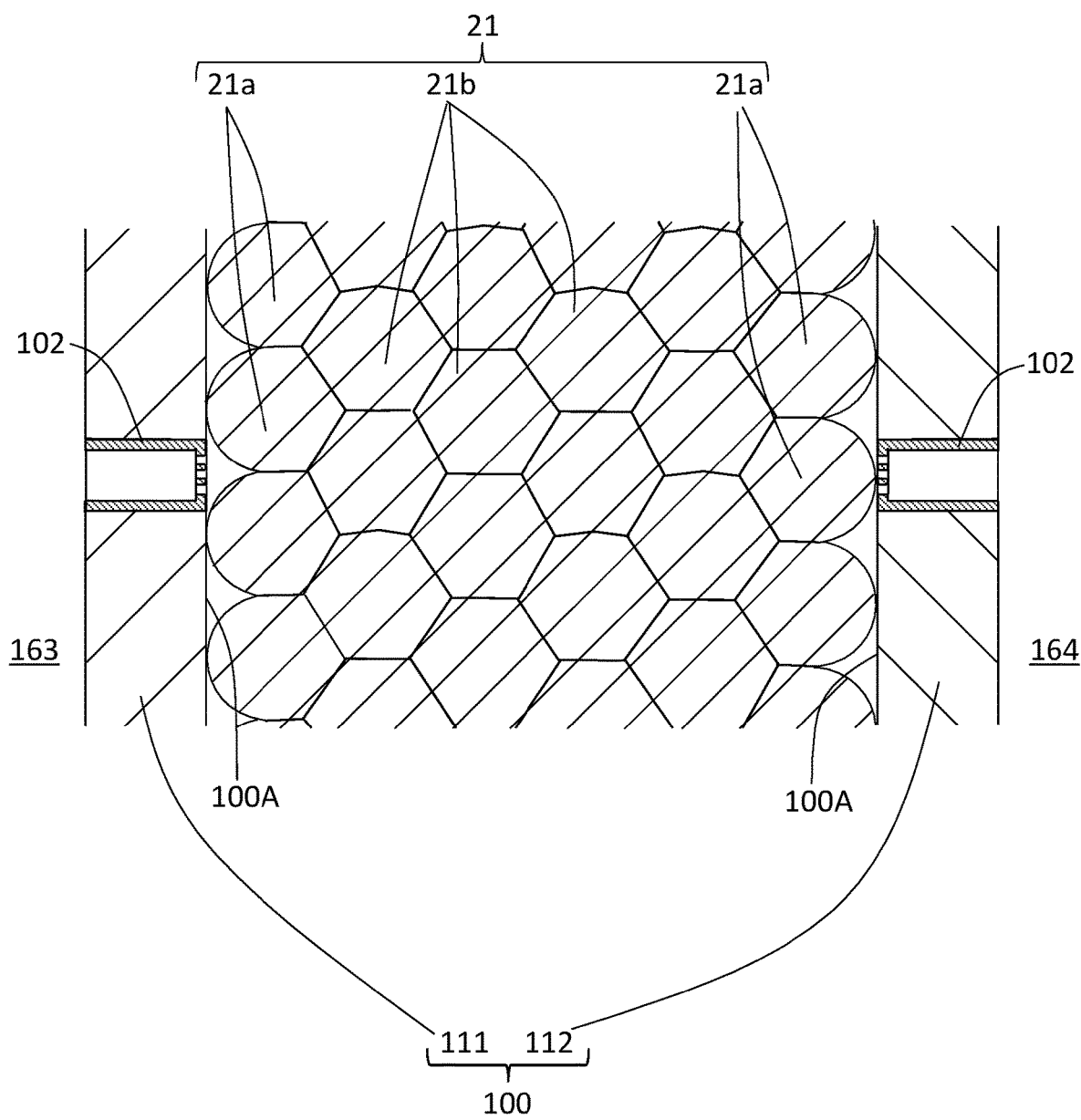
FIG. 7 is a cross-sectional schematic diagram for explaining a state after reverse unidirectional heating in a method for producing a foamed resin molded body 20. The position depicted in FIG. 7 corresponds to a portion 201 of the foamed resin molded body 20 illustrated in FIG. 3.

FIG. 7 schematically illustrates the state of the foamed resin molded body at the end of reverse unidirectional heating. As a result of the steps of unidirectional heating and reverse unidirectional heating, foamed resin particles 21b inside the cavity 101 are fused together by further-foaming. At this point, further-foaming of foamed resin particles 21a near the inner surface 100A of the mold 100 (near the surface layer) and fusion between the particles are not fully completed.

Figure 8:
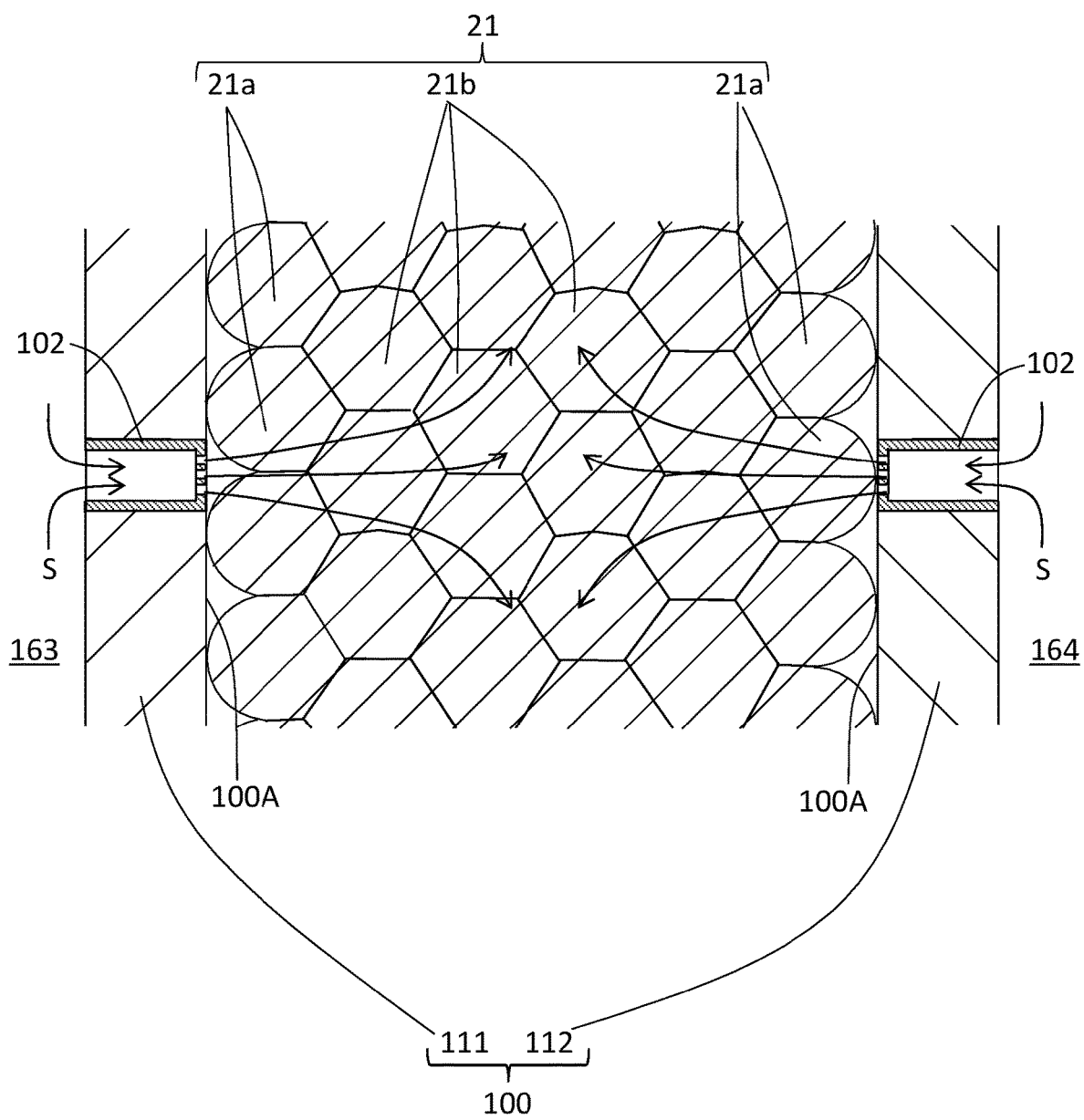
FIG. 8 is a cross-sectional schematic diagram for explaining a double-sided heating step in a method for producing a foamed resin molded body 20. The position depicted in FIG. 8 corresponds to a portion 201 of the foamed resin molded body 20 illustrated in FIG. 3.

Next, as illustrated in FIG. 8, water vapor pressure is increased in both the first heating chamber 163 and the second heating chamber 164 so as to supply water vapor S into the cavity 101 from both sides of the first mold 111 and the second mold 112. This step is referred to as "double-sided heating." In double-sided heating, the foamed resin particles 21a near the inner surface 100A of the mold 100 composed of the first mold 111 and the second mold 112 are further-foamed. In a usual method for producing a foamed resin molded body, double-sided heating is sufficiently performed so as to complete further-foaming of the foamed resin particles 21a near the inner surface 100A of the mold 100 and fusion between the particles, thereby producing a foamed resin molded body having a smooth surface with a surface expansion rate close to 100%. This embodiment is characterized in that a foamed resin molded body 20 having a surface with a surface expansion rate of 40% to 85% or 60% to 85% is produced by adjusting double-sided heating conditions as appropriate without completing further-foaming of the foamed resin particles 21a near the inner surface 100A of the mold 100.

Figure 9:
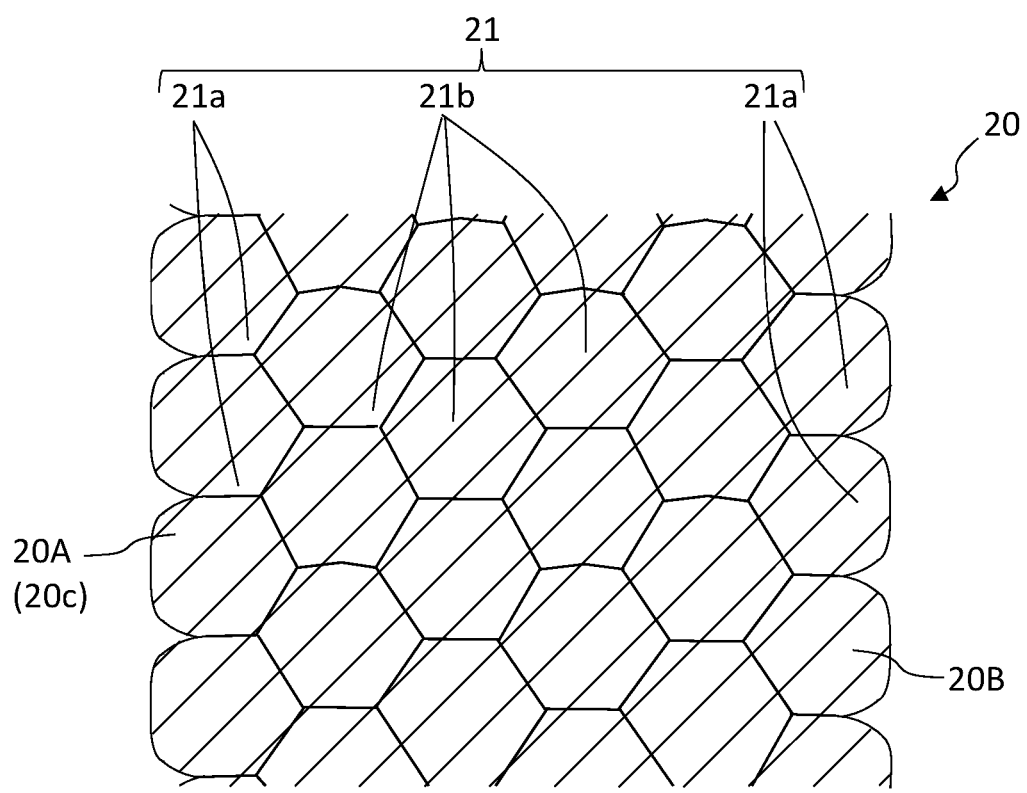
FIG. 9 is a cross-sectional schematic diagram of a foamed resin molded body 20 after completion of the production. The position depicted in FIG. 9 corresponds to a portion 201 of the foamed resin molded body 20 illustrated in FIG. 3.

After double-sided heating, the mold is removed to obtain a foamed resin molded body 20 as illustrated in FIG. 9. In the illustrated example, not only the surface 20A of the foamed resin molded body 20 to which the cushion 40 is bonded but also the surface 20B to which the cushion 40 is not bonded comprise a region having a surface expansion rate of 40% to 85% or 60% to 85%. Although not shown, in a case in which the surface expansion rate of the surface 20B of the foamed resin molded body 20 is set to, for example, 90% or more, which is higher than that of the surface 20A to which the cushion 40 is bonded, heating from the side of the second mold 112 facing the surface 20B of the foamed resin molded body 20 may be performed selectively for a long time or at a high temperature.

<4. Method for Producing Vehicle Seat Pad>

The method for producing a vehicle seat pad 1 in which a cushion 40 is integrated with a vehicle seat core 10 comprising a foamed resin molded body 20 will be described with reference to FIGS. 14 and 15.

The cushion 40 is typically a molded body made of a soft foamed resin material, which is specifically a foamed polyurethane molded body (urethane foam) and preferably a soft foamed polyurethane molded body. A resin solution that forms foamed polyurethane by foaming and curing contains a chain extender, a catalyst, and a foaming agent as well as a polyisocyanate component and a polyol component.

Figure 14:
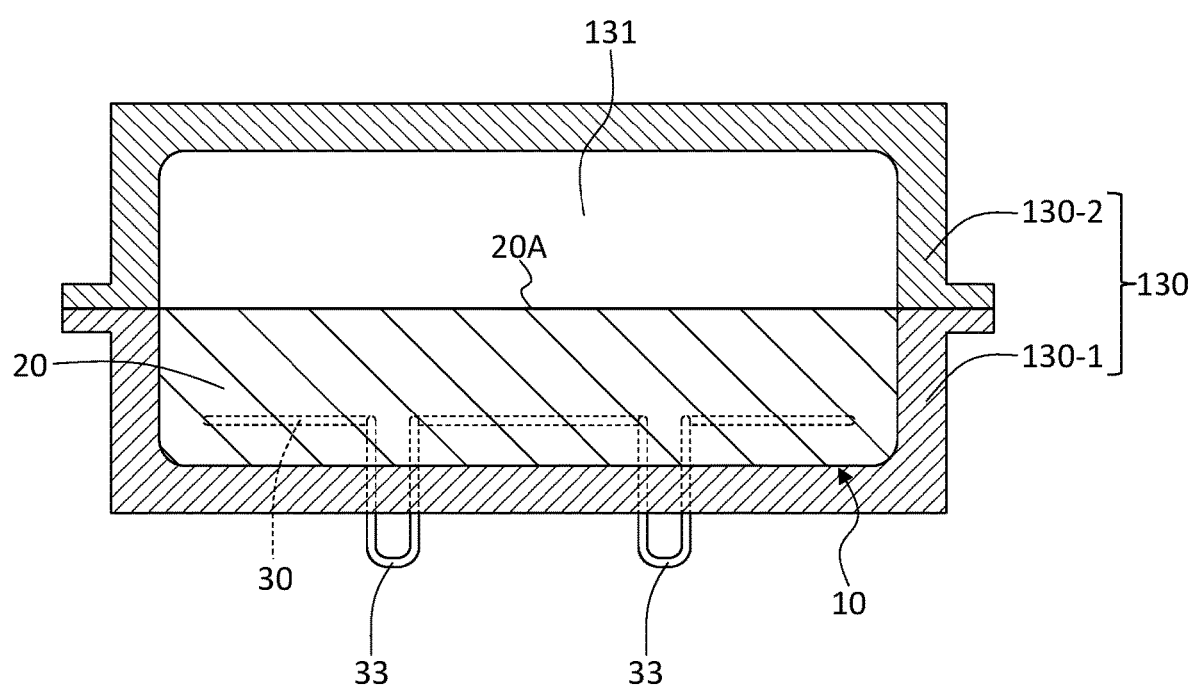
FIG. 14 is a cross-sectional schematic diagram (1) for explaining a method for producing the vehicle seat pad 1.

First, as illustrated in FIG. 14, the seat core 10 is accommodated in a cavity 131 of a seat pad mold 130 in which the cavity 131 having a shape corresponding to the vehicle seat pad 1 is formed. At such time, the seat core 10 is accommodated such that the surface 20A of the foamed resin molded body 20 to which the cushion 40 is bonded faces the gap in the cavity 131.

In the illustrated embodiment, the seat pad mold 130 is composed of a combination of a pair of molds 130-1 and 130-2 and is configured such that a cavity 131 having a shape corresponding to the vehicle seat pad 1 is formed therein by combining a pair of molds 130-1 and 130-2. Although FIGS. 14 and 15 illustrates in a simplified manner, in a case in which the seat core 10 is provided with a frame 30 having first protrusions 33, 33 and a second protrusion 35 formed thereon as well as the foamed resin molded body 20, it is preferable that the seat pad mold 130 is configured such that when the seat core 10 is accommodated in the cavity 131, the first protrusions 33, 33 and the second protrusion 35 of the frame 30 are positioned outside the cavity 131.

Figure 15:
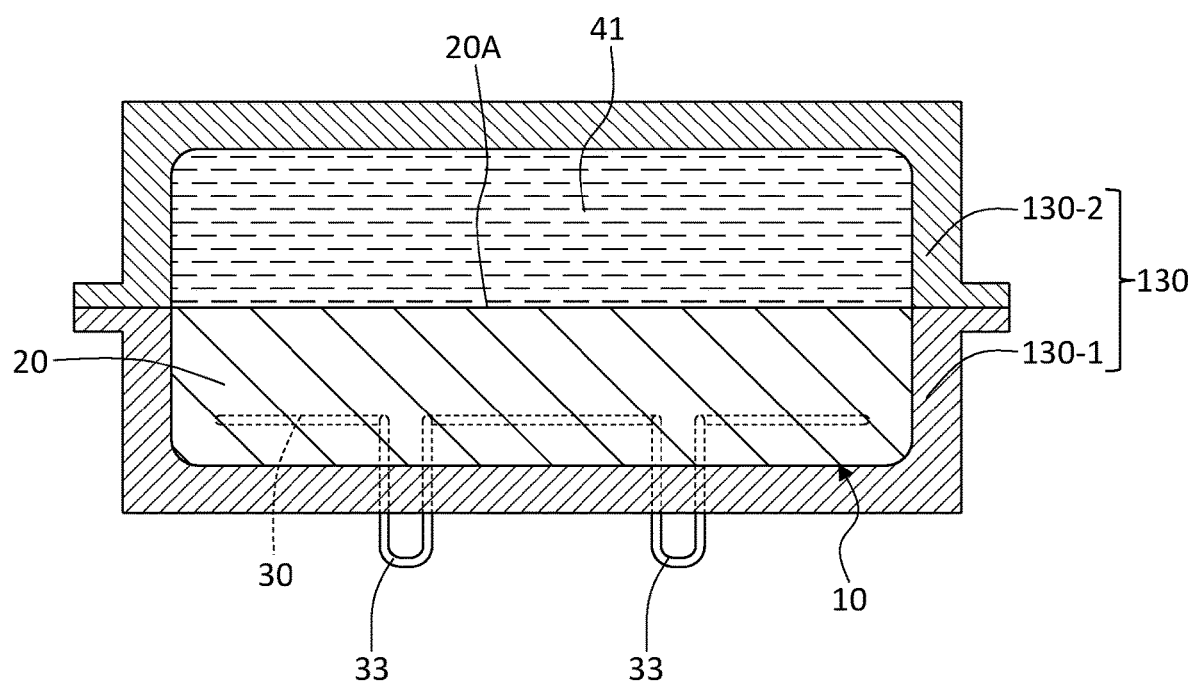
FIG. 15 is a cross-sectional schematic diagram (2) for explaining a method for producing the vehicle seat pad 1.

Next, as illustrated in FIG. 15, the cavity 131 of the seat pad mold 130 in which the seat core 10 is accommodated is filled with the resin solution 41, which forms a cushion 40 by foaming and curing, followed by foaming and curing, thereby a cushion 40 is formed. In a case in which the cushion 40 is polyurethane foam, heating is performed as necessary after filling the resin solution 41 for foaming and curing of the resin solution 41.

Since the resin solution 41 is in a liquid state, when the cavity 131 is filled therewith, the resin solution can follow the concavo-convex structure of the surface 20A of the foamed resin molded body 20 of the seat core 10 so as to closely contact the surface. The thus formed cushion 40 is firmly bonded to the surface 20A of the foamed resin molded body 20 of the seat core 10 in a state in which the formed cushion 40 is partially penetrating into the interface.

EXAMPLES

<Molding>

In the Examples and Comparative Examples described below, foamed resin particles containing a composite resin of a polystyrene resin and a polyolefin resin with an expansion ratio of 30 times (0.033 g/cm$^3$) (PIOCELAN (registered trademark): POOP-30ELV, manufactured by SEKISUI PLASTICS CO., Ltd.) was used.

A foamed resin molded body was produced by in-mold foam molding using the foamed resin particles. A foam molding machine 160 provided with a mold 100 having a rectangular cavity 101 with dimensions of 400 mm×300 mm×30 mm on each side was used for in-mold foam molding.

Figure 16:
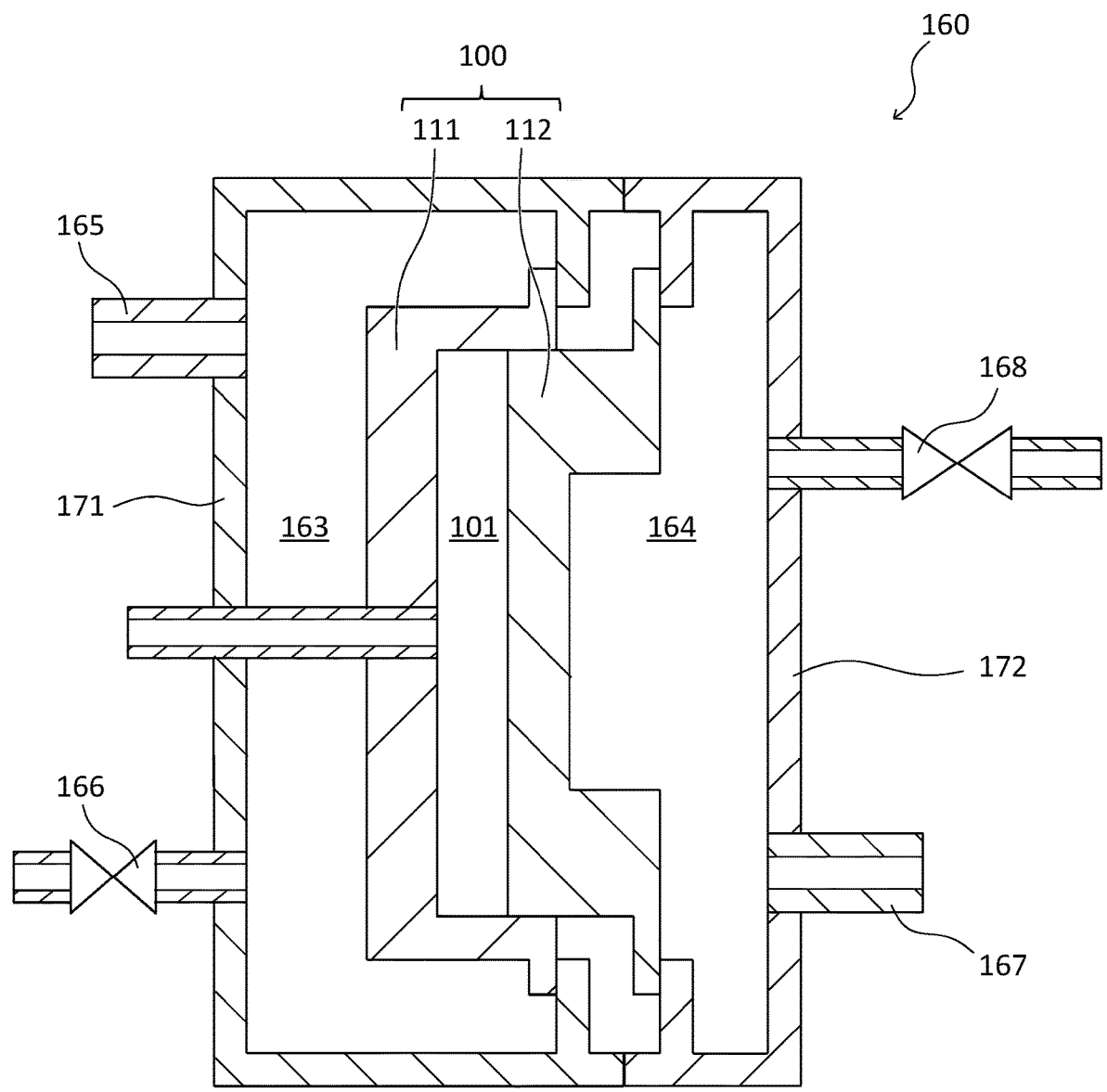
FIG. 16 is a cross-sectional schematic diagram for explaining the structure of a foam molding machine 160 used for producing the vehicle seat pad 1.

The foam molding machine 160 will be described with reference to FIG. 16. The mold 100 included in the foam molding machine 160 is composed of a female mold 111 and a male mold 112 facing each other, and foamed resin particles are introduced into a cavity 101 formed between the molds 111 and 112. The male mold 112 which is a movable type moves to the left and right. Alternatively, the female mold 111 may move.

The outside of the female mold 111 is surrounded by a first outer wall 171, and a first heating chamber 163 into which heating steam is introduced is formed between the outside of the female mold 11 and the first outer wall 171. Similarly, the outside of the male mold 112 is surrounded by a second outer wall 172, and a second heating chamber 164 into which heating steam is introduced is formed between the outside of the male mold 112 and the second outer wall 172. The first heating chamber 163 has a first steam introduction cylinder 165 and a first drain valve 166 through which steam is discharged, and the second heating chamber 164 has a second steam introduction cylinder 167 and a second drain valve 168 through which steam is discharged. Foamed resin particles are supplied from a supply cylinder 169 into the cavity 101.

Although not shown, small steam holes (corresponding to the steam hole 103 in FIG. 4) through which steam can pass are opened in the female mold 111 and the male mold 112. The diameter of the steam holes is smaller than the diameter of the foamed resin particles, and thus, the foamed resin particles do not fall out of the steam hole.

In in-mold foam molding using the foam molding machine 160, four steps of "mold heating," "unidirectional heating," "reverse unidirectional heating," and "double-sided heating" are performed.

"Mold heating" is a step of introducing heating steam into the first and second heating chambers 163 and 164 from the first and second steam introduction cylinders 165 and 167, respectively, with the first and second drain valves 166 and 168 opened for the purpose of warming a mold 100 before starting. In this step, the steam entering the first and second heating chambers 163 and 164 warms the mold 100 and removes excess air in the mold 100 and it is discharged from the first and second drain valves 166 and 168.

In "unidirectional heating," heating steam is introduced from the first steam introduction cylinder 165 into the first heating chamber 163 with the first drain valve 166 closed and the second drain valve 168 opened. In this step, the heating steam is discharged from the second drain valve 168 after heating the foam-molded body in the cavity 101.

"Reverse unidirectional heating" is performed as the next step after the "unidirectional heating." In "reverse unidirectional heating," heating steam is introduced from the second steam introduction cylinder 167 to the second heating chamber 164 with the second drain valve 168 closed and the first drain valve 166 opened. In this step, the foam-molded body in the cavity 101 is heated with heating steam from the side of the second heating chamber 164.

"Double-sided heating" is performed as the next step after the "reverse unidirectional heating." In "double-sided heating," heating stem is introduced from the first and second steam introduction cylinders 165, 167 into the first and second heating chambers 163, 164 with the first and second drain valves 166, 168 closed. In this step, the foam-molded body in the cavity 101 is heated with heating steam, thereby facilitating the surface of the foam-molded body to elongate.

The cavity 101 is filled with the above foamed resin particles having an expansion ratio of 30 times using the foam molding machine 160, and the steps of mold heating, unidirectional heating, reverse unidirectional heating, and double-sided heating were performed in such order using steam at a steam pressure of 0.08 mPa, followed by cooling and demolding. Then, a foamed resin molded body was taken out. Foamed resin molded bodies each having a different surface expansion rate, a different first fusion rate, and a different second fusion rate were formed for the Examples and Comparative Examples by adjusting the duration of each step as shown in Table 1. Each numerical value shown in Table 1 indicates the processing time (second) of each step.

TABLE 1

| Step | Comparative Example 1 | Example 1 | Example 2 | Example 3 | Comparative Example 2 | Comparative Example 3 | Comparative Example 4 |
|---|---|---|---|---|---|---|---|
| Mold heating | 2 | 2 | 3 | 3 | 4 | 4 | 4 |
| Unidirectional heating | 3 | 4 | 4 | 6 | 7 | 8 | 8 |
| Reverse unidirectional heating | 2 | 2 | 3 | 3 | 5 | 5 | 5 |
| Double-sided heating | 5 | 7 | 8 | 10 | 12 | 14 | 15 |

The thus obtained foamed resin molded bodies of the Examples and Comparative Examples had an actual expansion ratio of 29.8 times.

<Molded Body Analysis>

The surface expansion rate, first fusion rate, second fusion rate, peeling strength, and compressive strength of each foamed resin molded body were determined separately.

Measurement of Surface Expansion Rate:

One of the two main surfaces of each foamed resin molded body were observed using a scanning electron microscope(SEM-EDS (S-3400N), Hitachi, Ltd. and HORIBA, Ltd.), the observed image was processed, and the surface expansion rate was determined. Specifically, a 1×1 cm image obtained with a scanning electron microscope was used for manually marking the area where the surface was not expanded, the black-and-white contrast was added to highlight the occurrence or non-occurrence of surface expansion, and the area ratio was automatically calculated using the image processing software NS2K-Pro (Nanosystem Corporation), thereby determining the surface expansion rate.

Measurement of First Fusion Rate:

Each foamed resin molded body was cut into two, and the proportion of the area of foamed resin particles with respect to a sectional area of 1 cm$^2$ on a cross-section was determined.

First fusion rate=(Cross-section area of foamed resin particles/1 cm$^2$)×100

Measurement of Second Fusion Rate:

Each foamed resin molded body was divided into two by hand. The number of particles having a fracture inside thereof (a) and the number of particles having a fracture on the interface between particles (b) were counted within a range of 100 to 150 foamed particles appearing on a fracture surface. The value obtained by substituting the results into the formula [(a)/((a)+(b))]×100 was determined to be the second fusion rate (%). Each foamed resin molded body was divided into two by making a cut line with a depth of about 5 mm with a cutter knife in the longitudinal direction along the center of one main surface of the foamed resin molded body, and then, dividing the foamed resin molded body into two by hand along this cut line.

Measurement of Peeling Strength:

Henkel Japan (Duffix) Sista M5230 was used as a foamed urethane stock solution. The foamed urethane stock solution was applied to one of the two main surfaces of each foamed resin molded body that had passed 2 weeks after molding. After 72 hours for waiting, a 100 mm×20 mm square foamed urethane layer having a thickness of 20 mm was formed. The foamed resin molded body on which the foamed urethane layer was formed was fixed with a clamp, and one end of the foamed urethane layer was held with the arm of a peeling strength measuring device. The peeling strength when peeling the foamed urethane layer off at a speed of 200 mm/minute in a direction perpendicular to the surface on which the foamed urethane layer was formed was measured. The measurement was performed at 23° C. and a humidity of 50%.

Measurement of Compressive Strength:

The compressive strength of each foamed resin molded body was measured by a method in accordance with ISO844.

<Results>

Table 2 shows the analysis results of foamed resin molded bodies in Examples 1 to 3 and Comparative Examples 1 to 4.

TABLE 2

| Item | Unit | Comparative Example 1 | Example 1 | Example 2 | Example 3 | Comparative Example 2 | Comparative Example 3 | Comparative Example 4 |
|---|---|---|---|---|---|---|---|---|
| Surface expansion rate | % | 35 | 40 | 52 | 85 | 89 | 95 | 99 |
| First fusion rate | % | 97.6 | 98.8 | 98.7 | 99.3 | 99.8 | 100 | 100 |
| Second fusion rate | % | 25 | 64 | 72 | 88 | 92 | 95 | 100 |
| Peeling strength | N | 15.3 | 15.1 | 13.7 | 11.1 | 9.1 | 8.0 | 7.4 |
| Compressive strength | kPa | 151 | 180 | 185 | 197 | 200 | 200 | 201 |

The foamed resin molded body of Example 1 having a surface expansion rate of 40%, the foamed resin molded body of Example 2 having a surface expansion rate of 52%, and the foamed resin molded body of Example 3 having a surface expansion rate of 85% had sufficiently high peeling strengths of 15.1 N, 13.7 N, and 11.1 N, respectively, confirming that they can firmly hold a foamed urethane layer stacked thereon. In addition, the foamed resin molded body of Example 1 having a surface expansion rate of 40%, the foamed resin molded body of Example 2 having a surface expansion rate of 52%, and the foamed resin molded body of Example 3 having a surface expansion rate of 85% had high second fusion rates of 64%, 72%, and 88% along with sufficiently high compressive strength values of 180 kPa, 185 kPa, and 197 kPa, respectively. Therefore, they satisfied the required strength as a vehicle seat core.

Meanwhile, although the foamed resin molded body of Comparative Example 1 having a surface expansion rate of 35% had a high peeling strength of 15.3 N, it has a very small second fusion rate (25%) and a very low compressive strength value of 151 kPa. Therefore, the foamed resin molded body of Comparative Example 1 did not satisfy the required strength as a vehicle seat core.

The foamed resin molded body of Comparative Example 2 having a surface expansion rate of 89%, the foamed resin molded body of Comparative Example 3 having a surface expansion rate of 95%, and the foamed resin molded body of Comparative Example 4 having a surface expansion rate of 99% had small peeling strength values of 9.1 N, 8.0 N, and 7.4 N, respectively. There is concern that the foamed resin molded bodies of Comparative Example 2, Comparative Example 3, and Comparative Example 4 having such peeling strength values may not firmly hold a foamed urethane layer stacked thereon.

REFERENCE SIGNS LIST

1: Vehicle seat pad, 10: Vehicle seat core. 20: Foamed resin molded body, 20A: Surface of foamed resin molded body 20 to which cushion 40 is bonded, 20B: Surface of foamed resin molded body 20 to which cushion 40 is not bonded, 20c: Region having a certain surface expansion rate, 20X: Virtual plane corresponding to mold 100, 20Y: Surface on virtual plane 20X of foamed resin molded body 20, 21: Foamed resin particles, 30: Frame, 40: Cushion, 41: Resin solution that forms cushion 40 by foaming and curing, 100: Mold, 101: Cavity of mold 100, 120: Ridge, 120H: Height of ridge 120, 120P: Pitch between ridges 120, 130: Seat pad mold, 131: Cavity of seat pad mold 130

All publications, patents and patent applications cited in the present description are incorporated herein by reference in their entirety.

The invention claimed is:

1. A vehicle seat core for forming a vehicle seat pad by integration with a cushion, comprising
a foamed resin molded body obtained by filling a cavity of a mold with a plurality of foamed resin particles and performing in-mold foam molding,
wherein at least a partial region of a surface of the foamed resin molded body to which the cushion is bonded when forming the vehicle seat pad has a surface expansion rate of 40% to 85%, the surface expansion rate being a proportion of an area of a surface on a virtual plane corresponding to the mold of the foamed resin molded body with respect to an area of the virtual plane within the region, and
wherein the foamed resin molded body has a first fusion rate of 95% or more, the first fusion rate being a proportion of an area of foamed resin particles that appear on a cross-section obtained when cutting the foamed resin molded body with respect to an area of the cross-section.

2. A vehicle seat core for forming a vehicle seat pad by integration with a cushion, comprising
a foamed resin molded body obtained by filling a cavity of a mold with a plurality of foamed resin particles and performing in-mold foam molding,
wherein at least a partial region of a surface of the foamed resin molded body to which the cushion is bonded when forming the vehicle seat pad has a surface expansion rate of 40% to 85%, the surface expansion rate being a proportion of an area of a surface on a virtual plane corresponding to the mold of the foamed resin molded body with respect to an area of the virtual plane within the region, and
wherein the foamed resin molded body has a second fusion rate of 60% or more, the second fusion rate being a proportion of the number of foamed resin particles each having a fracture inside thereof with respect to the total number of foamed resin particles that appear on a fracture surface when dividing the foamed resin molded body.

3. The vehicle seat core according to claim 2, wherein the surface expansion rate of the region is 60% to 85%.

4. The vehicle seat core according to claim 2, wherein at least a partial region of a surface of the foamed resin molded body to which the cushion is not bonded when forming the vehicle seat pad has a surface expansion rate of 90% or more.

5. The vehicle seat core according to claim 2, wherein a plurality of protrusions having a height of 40 μm or more are formed at a part of the surface of the foamed resin molded body to which the cushion is bonded when forming the vehicle seat pad.

6. The vehicle seat core according to claim 5, wherein the plurality of protrusions are a plurality of ridges, and
a pitch between the plurality of ridges is 0.8 mm to 1.5 mm.

7. A vehicle seat pad, comprising:
the vehicle seat core according to claim 2; and
a cushion that is bonded to the foamed resin molded body of the vehicle seat core so as to be integrated with the vehicle seat core.

8. The vehicle seat pad according to claim 7, wherein a portion of the cushion being bonded with the foamed resin molded body is penetrating into the foamed resin molded body.

9. A method for producing a vehicle seat pad, comprising:
accommodating the vehicle seat core according to claim 2 in a cavity of a seat pad mold, the cavity having a shape corresponding to the vehicle seat pad; and
filling the cavity of the seat pad mold in which the vehicle seat core is accommodated with a resin solution that forms a cushion by foaming and curing; and,
performing foaming and curing, thereby forming the cushion.

10. The vehicle seat core according to claim 1, wherein the surface expansion rate of the region is 60% to 85%.

11. The vehicle seat core according to claim 1, wherein at least a partial region of a surface of the foamed resin molded body to which the cushion is not bonded when forming the vehicle seat pad has a surface expansion rate of 90% or more.

12. The vehicle seat core according to claim 1, wherein a plurality of protrusions having a height of 40 μm or more are formed at a part of the surface of the foamed resin molded body to which the cushion is bonded when forming the vehicle seat pad.

13. The vehicle seat core according to claim 12, wherein the plurality of protrusions are a plurality of ridges, and
a pitch between the plurality of ridges is 0.8 mm to 1.5 mm.

14. A vehicle seat pad, comprising:
the vehicle seat core according to claim 1; and
a cushion that is bonded to the foamed resin molded body of the vehicle seat core so as to be integrated with the vehicle seat core.

15. The vehicle seat pad according to claim 14, wherein a portion of the cushion being bonded with the foamed resin molded body is penetrating into the foamed resin molded body.

16. A method for producing a vehicle seat pad, comprising:
accommodating the vehicle seat core according to claim 1 in a cavity of a seat pad mold, the cavity having a shape corresponding to the vehicle seat pad; and filling the cavity of the seat pad mold in which the vehicle seat core is accommodated with a resin solution that forms a cushion by foaming and curing; and, performing foaming and curing, thereby forming the cushion.

\* \* \* \* \*